(12) United States Patent
Hsu et al.

(10) Patent No.: US 7,621,021 B2
(45) Date of Patent: Nov. 24, 2009

(54) TRANSVERSELY MOVABLE HINGE

(75) Inventors: Jia-Hao Hsu, Shulin (TW); Pen-Kun Lin, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 275 days.

(21) Appl. No.: 11/797,123

(22) Filed: May 1, 2007

(65) Prior Publication Data
US 2008/0271293 A1 Nov. 6, 2008

(51) Int. Cl.
*E05D 3/10* (2006.01)
(52) U.S. Cl. .......................................... 16/367; 16/340
(58) Field of Classification Search .................. 16/337, 16/338, 339, 342, 330, 303, 374, 376, 377, 16/340, 386, 367, 389, 392; 361/680–683, 361/814
See application file for complete search history.

(56) References Cited

U.S. PATENT DOCUMENTS

| | | | |
|---|---|---|---|
| 2005/0251965 A1* | 11/2005 | Lu et al. ........................ | 16/367 |
| 2005/0278895 A1* | 12/2005 | Su ................................. | 16/340 |
| 2006/0037175 A1* | 2/2006 | Hyun ............................ | 16/221 |
| 2006/0185126 A1* | 8/2006 | Su ................................. | 16/340 |
| 2006/0200945 A1* | 9/2006 | Lu et al. ........................ | 16/340 |
| 2007/0119024 A1* | 5/2007 | Kim .............................. | 16/337 |
| 2008/0078060 A1* | 4/2008 | Chen ............................ | 16/367 |

* cited by examiner

*Primary Examiner*—Victor Batson
*Assistant Examiner*—Rowland D Do
(74) *Attorney, Agent, or Firm*—Posz Law Group, PLC

(57) ABSTRACT

A transversely movable hinge has a central bracket and two tilt hinge assemblies and is mounted between a cover and a base of an electronic device to allow the cover to pivot and rotate relative to the base. Each tilt hinge assembly has a pivoting leaf with a mounting segment, a torque washer and a biasing assembly. The torque washer is rotated relative to the mounting segment and has at least one protrusion. The biasing assembly presses the torque washer so the protrusion rubs against the mounting segment to provide a larger force to hold the cover at any visual angle. Then even if the resilient force of the biasing assembly is reduced to allow the cover to be easily moved transversely relative to the base, the hinge can still provide enough holding force.

9 Claims, 5 Drawing Sheets

TRANSVERSELY MOVABLE HINGE

BACKGROUND OF THE INVENTION

1. Field of the Invention

The present invention relates to a hinge, especially to a hinge mounted between a base and a cover of an electronic device that can move the cover transversely relative to the base.

2. Description of the Prior Arts

Electronic devices such as notebook computers, cell phones, etc. have a cover, a base and a conventional hinge. The conventional hinge connects the cover to the base along a transverse axis and a longitudinal axis to allow the cover to pivot and rotate relative to the base. The cover has a front surface, a rear surface and a touch panel mounted in the front surface of the cover. The cover is rotated and closed via the conventional hinge so that the front or the rear surface selectively faces the base. The electronic device further has at least one latch mounted respectively in the base and the cover to hold the cover in position when the cover is closed relative to the base. To hold the cover in position whether the front surface or the rear surface of the cover faces the base, the latch is mounted on the front surface and the rear surface of the cover.

However, the position of the latches in the front and rear surfaces of the cover may not correspond to each other because of minor inaccuracies during manufacturing. Then, the latch in the base may not correspond to both the latch in the front and rear surfaces of the cover. Therefore, when the latch in the base corresponds to the latch in the front surface of the cover, the latch in the rear surface of the cover may not correspond to the latch in the base, and the cover cannot be held in position when the rear surface faces the base. Conversely, when the latch in the base corresponds to the latch in the rear surface of the cover, the latch in the front surface of the cover may not correspond to the latch in the base, and the cover cannot be held in position when the front surface faces the base.

To overcome the shortcomings, the present invention provides a transversely movable hinge to mitigate or obviate the aforementioned problem.

SUMMARY OF THE INVENTION

The main objective of the present invention is to provide a transversely movable hinge. The transversely movable hinge has a central bracket and two tilt hinge assemblies and is mounted between a cover and a base of an electronic device to allow the cover to pivot and rotate relative to the base. Each tilt hinge assembly has a pivoting leaf with a mounting segment, a torque washer and a biasing assembly. The torque washer is rotated relative to the mounting segment and had at least one protrusion. The biasing assembly presses the torque washer so the protrusion rubs against the mounting segment to provide larger force to hold the cover at any visual angle. Then even the resilient force of the biasing assembly is reduced to allow the cover easily being moved transversely relative to the base, the hinge can still provide enough holding force.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
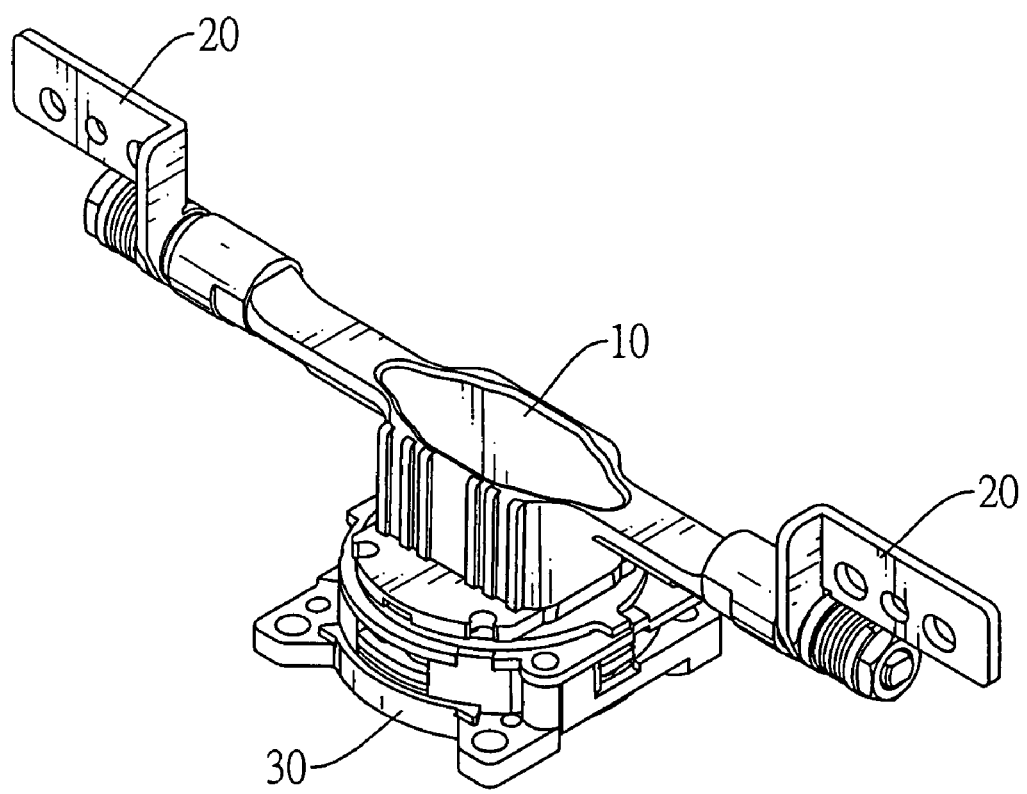
FIG. 1 is a perspective view of a transversely movable hinge in accordance with the present invention.

With reference to FIG. 1, a transversely movable hinge in accordance with the present invention comprises a central bracket (10), two tilt hinge assemblies (20) and a rotating hinge assembly (30).

Figure 2:
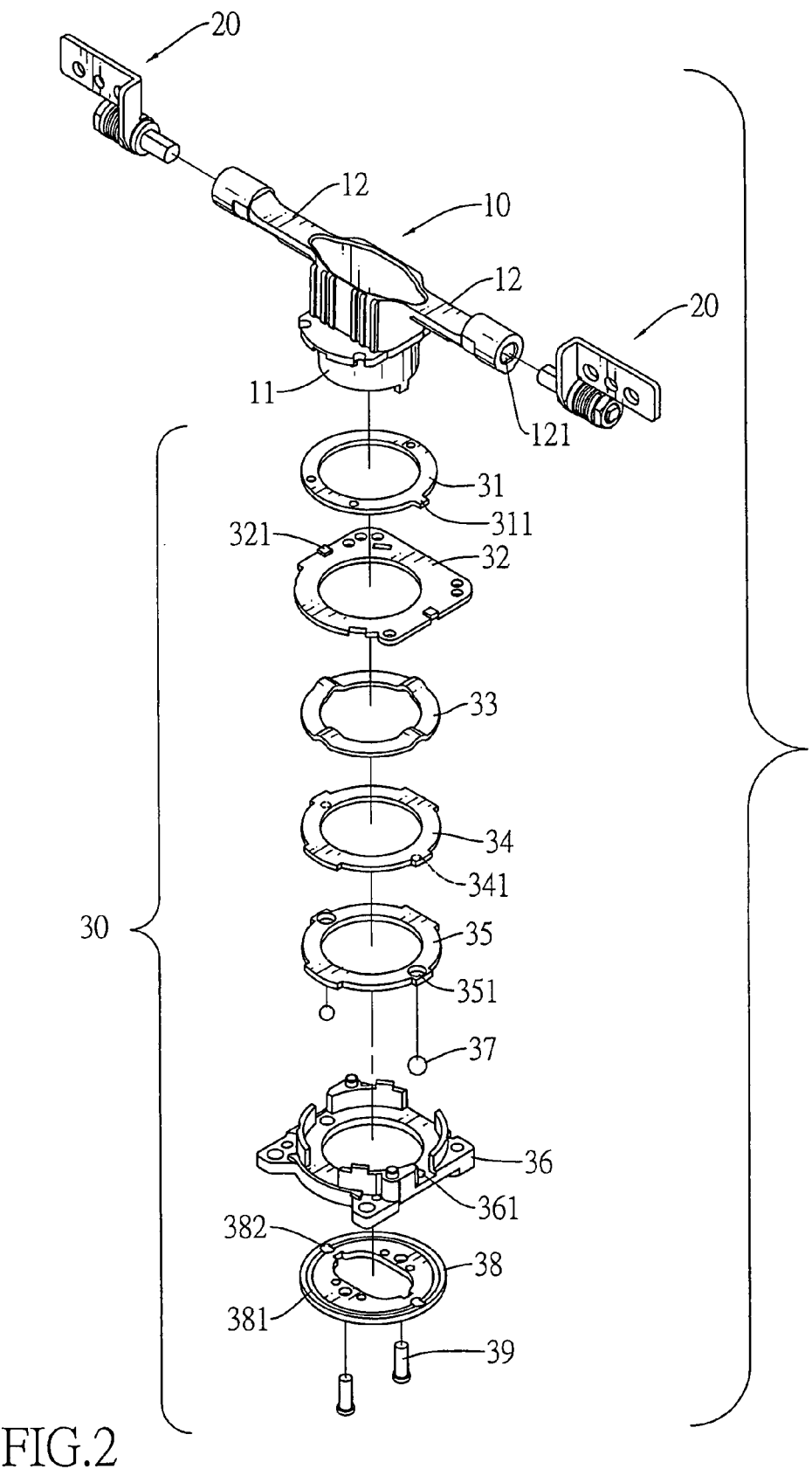
FIG. 2 is a partially exploded perspective view of the hinge in FIG. 1.

With further reference to FIG. 2, the central bracket (10) has a central pintle (11) and two side shafts (12). The central pintle (11) has a bottom and two sides. The side shafts (12) are formed transversely respectively on the two sides of the central pintle (11). Each side shaft (12) has a keyed recess (121). The keyed recess (121) is formed axially in the side shaft (12).

Figure 3:
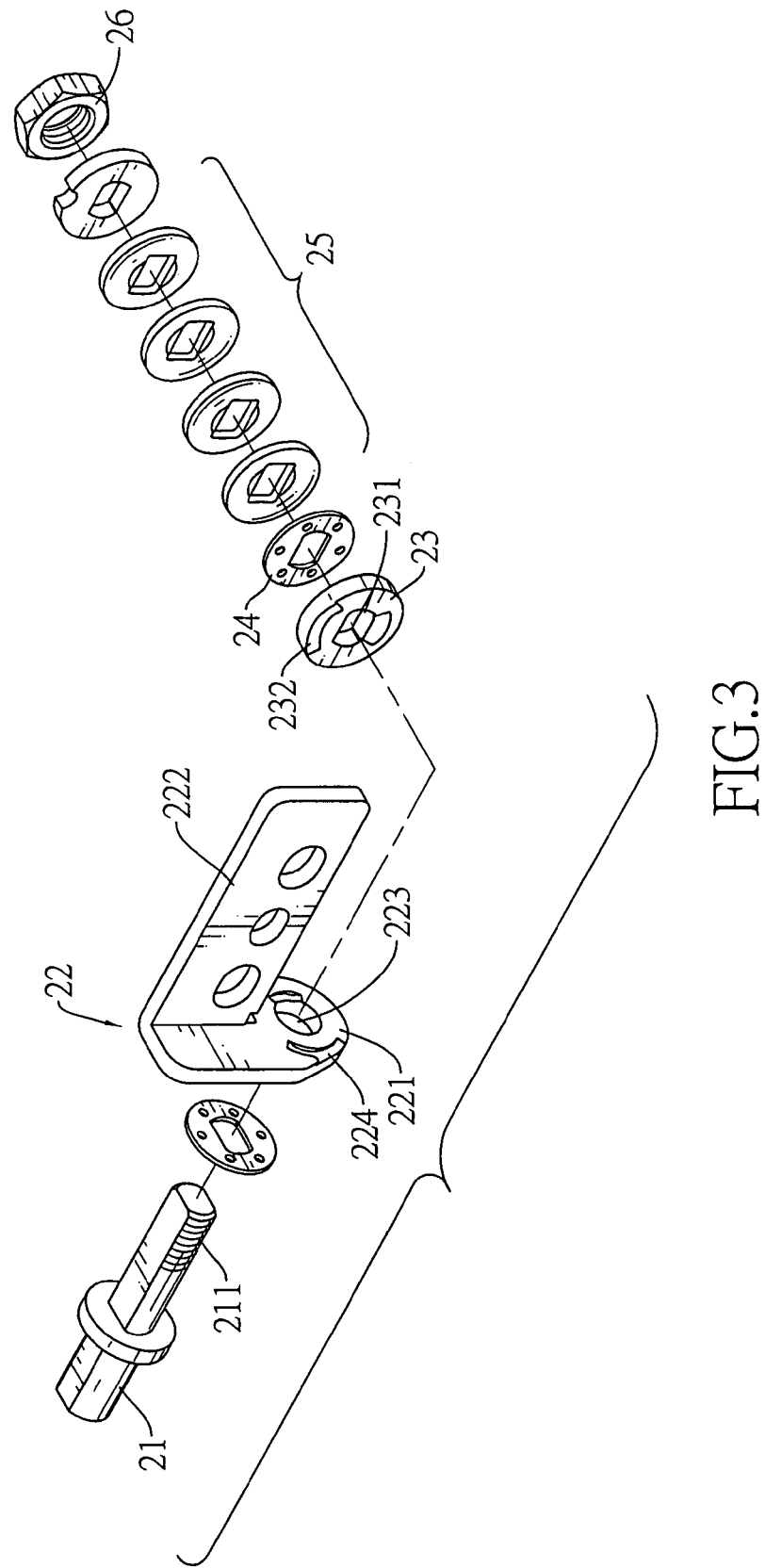
FIG. 3 is another partially exploded perspective view of the hinge in FIG. 1.

With further reference to FIG. 3, the tilt hinge assemblies (20) respectively connect to the side shafts (12) of the central bracket (10). Each tilt hinge assembly (20) comprises a rod (21), a pivoting leaf (22), a torque washer (23), multiple rubbing washers (24), a biasing assembly (25) and a fastening washer (26).

The rod (21) is mounted securely in the corresponding keyed recess (121), is non-circular in cross section and has a threaded segment (211) formed around the rod (21).

The pivoting leaf (22) is mounted rotatably around the rod (21) and has a mounting segment (221), a fastening segment (222), a central hole (223) and at least one detent (224). The mounting segment (221) is mounted rotatably around the rod (21) and has an outer surface. The fastening segment (222) extends out from the mounting segment (221). The central hole (223) is formed through the mounting segment (221) and is mounted around the rod (21). The detent (224) is formed in the outer surface of the mounting segment (221) around the central hole (223).

Figure 4:
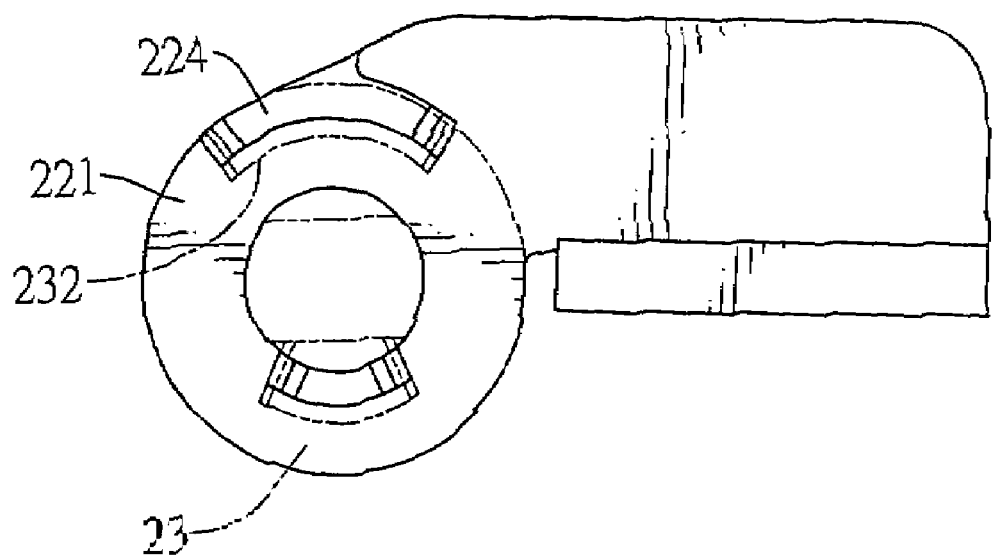
FIG. 4 is an enlarged end view of a pivoting leaf of the hinge in FIG. 1.

With further reference to FIG. 4, the torque washer (23) is mounted securely on the rod (21) adjacent to the outer surface of the mounting segment (221) of the pivoting leaf (22) and has an inner surface, a keyed hole (231) and at least one protrusion (232). The inner surface of the torque washer (23) faces the outer surface of the mounting segment (221) of the pivoting leaf (22). The keyed hole (231) is a non-circular hole, is formed through the torque washer (23) and engages the rod (21) to mount the torque washer (23) securely on the rod (21). The protrusion (232) is formed on the inner surface of the torque washer (23), rubs against the outer surface of the mounting segment (221) of the pivoting leaf (22) and does not engage with the detent (224) in the mounting segment (221) of the pivoting leaf (22).

The rubbing washers (24) are mounted around the rod (21) to reduce friction. The biasing assembly (25) is mounted around the rod (21) to press the torque washer (23) against the mounting segment (221) of the pivoting leaf (22). The fastening washer (26) is mounted securely on the rod (21) and may be a nut screwed onto the threaded segment (211) on the rod (21).

The rotating hinge assembly (30) connects to the central pintle (11) and comprises a limit (31), a stationary bracket (36), a bearing housing (35), a holding spacer (34), a resilient spacer (33), a positive stop (32), a fastening board (38), two ball bearings (37) and multiple fasteners (39).

The limit (31) is mounted around the central pintle (11), is attached securely to the central bracket (10) and has an outside edge and a limiting protrusion (311). The limiting protrusion (311) is formed on and extends transversely out from the outside edge of the limit (31).

The stationary bracket (36) is mounted around the central pintle (11) and has a top, a bottom and two through holes (361) opposite to each other.

The bearing housing (35) is mounted around the central pintle (11), is mounted securely in the top of the stationary bracket (36) and has two through holes (351). The through holes (351) in the bearing housing (35) are opposite to each other and respectively align with the through holes (361) in the stationary bracket (36).

The holding spacer (34) is mounted around the central pintle (11), is mounted securely in the top of the stationary bracket (36) adjacent to the bearing housing (35) and has a bottom surface and two ball bearing recesses (341). The ball bearing recesses (341) are formed in the bottom surface of the holding spacer (34) opposite to each other and respectively align with the through holes (351) in the bearing housing (35).

The resilient spacer (33) is mounted around the central pintle (11) and is mounted securely in the top of the stationary bracket (36) adjacent to the holding spacer (34) to press the holding spacer (34) against the bearing housing (34).

The positive stop (32) is mounted around the central pintle (11), is mounted securely on the top of the stationary bracket (36) to hold the resilient spacer (33), the holding spacer (34) and the bearing housing (35) in the top of the stationary bracket (36) and has a top surface and two limiting protrusions (321). The protruding stops (321) are formed separately on the top surface of the positive stop (32) and selectively abut the limiting protrusion (311) on the limit (31) to limit the rotating angle.

The fastening board (38) is attached securely on the bottom of the central pintle (11), is mounted on the bottom of the stationary bracket (36) and has a top surface, a race (381) and two positioning detents (382). The race (381) is formed in the top surface of the fastening board (38) and corresponds to the through holes (361) in the stationary bracket (36). The positioning detents (382) are formed oppositely in the race (381) and respectively align with the through holes (361) in the stationary bracket (36).

Each ball (37) is mounted in the corresponding ball bearing recess (341) in the holding spacer (34), is mounted in the corresponding through holes (361, 351) in the stationary bracket (36) and the bearing housing (35) and extends out of the corresponding through hole (361) in the stationary bracket (36). The balls (37) slide in the race (381) in the fastening board (38) and selectively engage the positioning detents (382) in the fastening board (38).

The fasteners (39) extend through the fastening board (38) and are mounted securely in the bottom of the central pintle (11) to attach the fastening board (38) securely to the central pintle (11).

Figure 5:
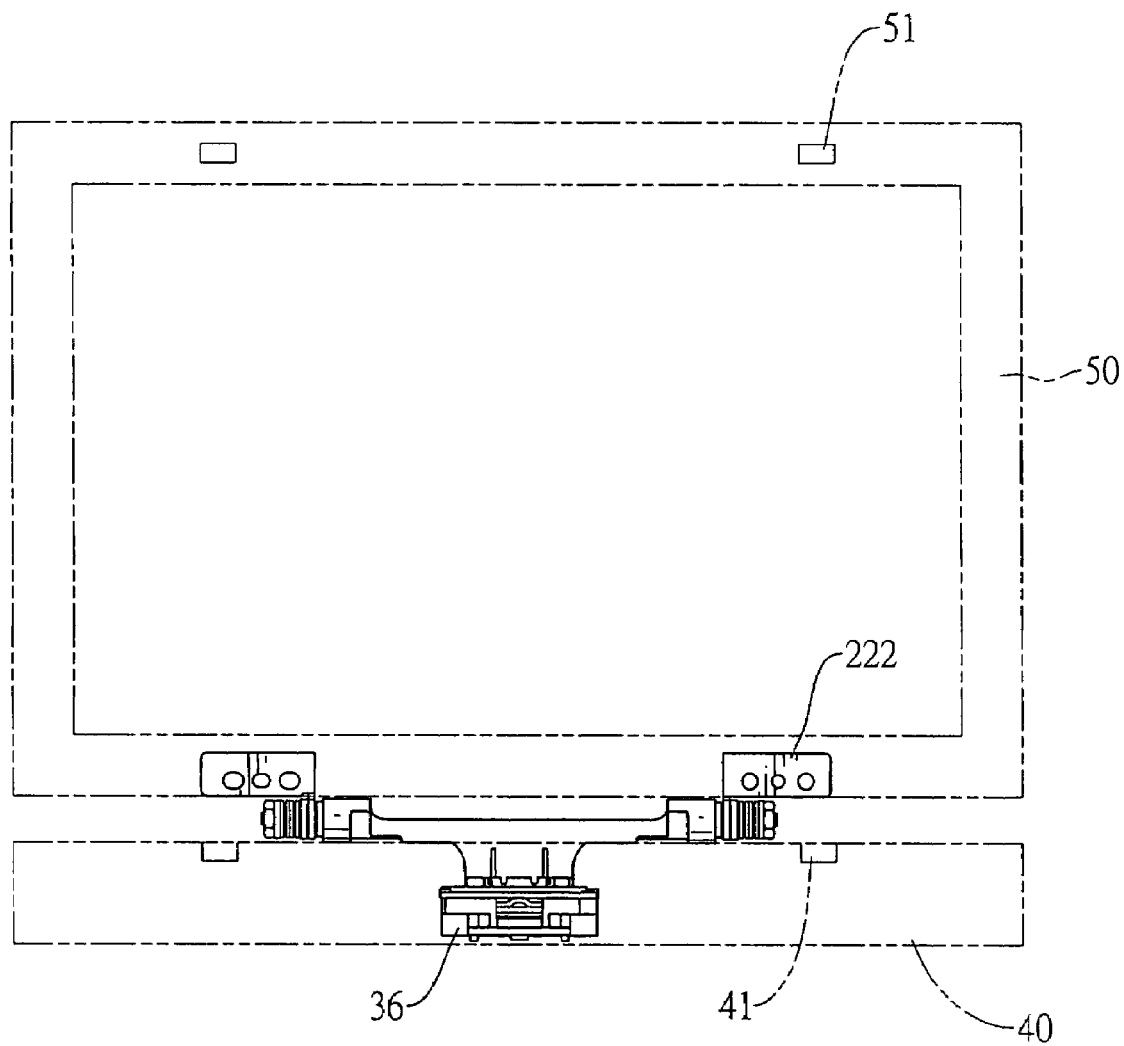
FIG. 5 is an operational front view of an electronic appliance with the hinge in FIG. 1.

With further reference to FIG. 5, the hinge as described is mounted between a cover (50) and a base (40) of an electronic device. The stationary bracket (36) is mounted securely to the base (40). The fastening segments (222) of the pivoting leaves (22) are mounted securely in the cover (50). The base (40) has a latch (41) formed in the base (40). The cover (50) has a front surface, a rear surface and two latches (51). The latches (51) are formed respectively on the front and rear surfaces of the cover and correspond to the latch (41) in the base (40).

When the cover (50) is opened relative to the base (40), the hinge as described provides a holding force to maintain the cover (50) at any visual angle. The holding force comprises the sum of a frictional holding force and a resilient force. The mounting segments (221) of the pivoting leaves (22) are rotated relative to the torque washers (23). The protrusions (232) of the torque washers (23) rub against the inner surface of the mounting segments (221) of the pivoting leaves (22) causing the frictional holding force. The resilient force is provided by the biasing assemblies (25). Because the frictional holding force is increased, the hinge can still provide enough holding force when the resilient forces of the biasing assemblies (25) are reduced. Since the resilient forces of the biasing assemblies (25) are reduced, the user can easily move the cover (50) transversely relative to the base (40) to align the latches (51) on the front and rear surfaces of the cover (50) with the latch (41) in the base (40). Then the cover (50) can be held on the base (40) whether the front or rear surface of the cover (50) faces the base (40). Therefore, the hinge as described not only provides enough holding force to hold the cover (50) at any visual angle but also allows the cover (50) to move transversely.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A transversely movable hinge comprising:
 a central bracket having
  two sides;
  a central pintle having a bottom and two sides; and
  two side shafts formed transversely respectively on the sides of the central pintle;
 two tilt hinge assemblies respectively connecting to the side shafts of the central bracket, and each tilt hinge assembly comprising
  a rod connecting securely to the central bracket;
  a pivoting leaf having a mounting segment mounted around the rod;
  each mounting segment having
   an outer surface facing the inner surface of a corresponding torque washer; and
   at least one detent formed in the outer surface of the mounting segment;
  a torque washer mounted securely on the rod and having an inner surface; and
   at least one protrusion formed on the inner surface of the torque washer and rubbing against the mounting segment of the pivoting leaf;
  a biasing assembly mounted around the rod to press the torque washer against the mounting segment of the pivoting leaf; and
  a fastening washer mounted securely on the rod; and
 a rotating hinge assembly connecting rotatably to the central pintle of the central bracket comprising a stationary bracket mounted around the central pintle and having a top, a bottom and two opposite through holes;

a bearing housing mounted around the central pintle, mounted securely in the top of the stationary bracket and having two through holes opposite to each other and respectively aligning with the through holes in the stationary bracket;

a holding spacer mounted around the central pintle, mounted securely in the top of the stationary bracket adjacent to the bearing housing and having a bottom surface; and two ball bearing recesses formed in the bottom surface of the holding spacer opposite to each other and respectively aligning with the through holes in the bearing housing;

a resilient spacer mounted around the central pintle and mounted securely in the top of the stationary bracket adjacent to the holding spacer;

a positive stop mounted around the central pintle and mounted securely on the top of the stationary bracket to hold the resilient spacer, the holding spacer and the bearing housing in the top of the stationary bracket;

a fastening board attached securely on the bottom of the central pintle, mounted on the bottom of the stationary bracket and having a top surface;

a race formed in the top surface of the fastening board and corresponding to the through holes in the stationary bracket; and two positioning detents formed oppositely in the race and respectively aligning with the through holes in the stationary bracket; and two balls sliding in the race in the fastening board and selectively engaging the positioning detents in the fastening board, and each ball mounted in a corresponding ball bearing recess in the holding spacer, mounted in a corresponding through hole in the stationary bracket and in the bearing housing and extending out of the corresponding through hole in the stationary bracket.

2. The hinge as claimed in claim 1, wherein each side shaft has a keyed recess formed axially in the side shaft; and each rod is non-circular in cross section and is mounted securely in the keyed recess in a corresponding side shaft.

3. The hinge as claimed in claim 1, wherein each tilt hinge assembly comprises multiple rubbing washers mounted around the rod.

4. The hinge as claimed in claim 1, wherein the rotating hinge assembly comprises a limit mounted around the central pintle adjacent to the positive stop, attached securely to the central bracket and having an outside edge; and a limiting protrusion formed on and extending transversely out from the outside edge of the limit; and the positive stop has a top surface; and two protruding stops formed separately on the top surface of the positive stop and selectively abutting the limiting protrusion on the limit.

5. The hinge as claimed in claim 1, wherein each rod has a threaded segment formed around the rod;

each fastening washer is a nut screwed onto the threaded segment of a corresponding rod; and the rotating hinge assembly has multiple fasteners extending through the fastening board and mounted securely in the bottom of the central pintle.

6. The hinge as claimed in claim 1, wherein each side shaft has a keyed recess formed axially in the side shaft; and each rod is non-circular in cross section and is mounted securely in the keyed recess in a corresponding side shaft.

7. The hinge as claimed in claim 6, wherein each tilt hinge assembly comprises multiple rubbing washers mounted around the rod.

8. The hinge as claimed in claim 7, wherein the rotating hinge assembly comprises a limit mounted around the central pintle adjacent to the positive stop, attached securely to the central bracket and having an outside edge; and a limiting protrusion formed on and extending transversely out from the outside edge of the limit; and the positive stop has a top surface; and two protruding stops formed separately on the top surface of the positive stop and selectively abutting the limiting protrusion on the limit.

9. The hinge as claimed in claim 8, wherein each rod has a threaded segment formed around the rod;

each fastening washer is a nut screwed onto the threaded segment of a corresponding rod; and the rotating hinge assembly has multiple fasteners extending through the fastening board and mounted securely in the bottom of the central pintle.

* * * * *